US006598790B1

(12) United States Patent
Horst

(10) Patent No.: US 6,598,790 B1
(45) Date of Patent: Jul. 29, 2003

(54) SELF-SERVICE CHECKOUT

(76) Inventor: Douglas B. Horst, 19 Colonial Dr., Huntington, NY (US) 11743

(*) Notice: Subject to any disclaimer, the term of this patent is extended or adjusted under 35 U.S.C. 154(b) by 0 days.

(21) Appl. No.: 09/599,630

(22) Filed: Jun. 22, 2000

Related U.S. Application Data

(60) Provisional application No. 60/140,395, filed on Jun. 22, 1999.

(51) Int. Cl.[7] .......... G06K 15/00

(52) U.S. Cl. .......... 235/383; 235/378; 235/385; 235/375; 235/462.01

(58) Field of Search .......... 235/383, 462.01, 235/375, 385; 186/61, 66

(56) References Cited

U.S. PATENT DOCUMENTS

| | | | | | |
|---|---|---|---|---|---|
| 5,013,896 | A | | 5/1991 | Ono et al. | 235/381 |
| 5,083,638 | A | | 1/1992 | Schneider | 186/61 |
| 5,345,071 | A | | 9/1994 | Dumont | 235/383 |
| 5,416,306 | A | | 5/1995 | Imahata | 235/380 |
| 5,497,853 | A | | 3/1996 | Collins et al. | 186/61 |
| 5,584,362 | A | * | 12/1996 | Dumont | 235/383 |
| 5,595,264 | A | | 1/1997 | Trotta, Jr. | 186/56 |
| 5,710,540 | A | | 1/1998 | Clement et al. | 340/572 |
| 5,745,036 | A | | 4/1998 | Clare | 340/572 |
| 5,752,582 | A | | 5/1998 | Hayward | 186/61 |
| 5,859,779 | A | | 1/1999 | Giordano et al. | 364/479.01 |
| 5,963,134 | A | * | 10/1999 | Bowers et al. | 340/572.1 |
| 5,979,758 | A | * | 11/1999 | Swartz et al. | 235/383 |
| 5,990,794 | A | * | 11/1999 | Alicot et al. | 235/383 |
| 5,992,570 | A | * | 11/1999 | Walter et al. | 186/36 |
| 6,102,290 | A | * | 8/2000 | Swartz et al. | 235/462.01 |
| 6,112,857 | A | * | 9/2000 | Morrison | 186/61 |
| 6,154,135 | A | * | 11/2000 | Kane et al. | 340/572 |
| 6,215,078 | B1 | * | 4/2001 | Torres et al. | 177/25.15 |
| 6,354,497 | B1 | * | 3/2002 | Lippert et al. | 235/383 |

FOREIGN PATENT DOCUMENTS

| | | |
|---|---|---|
| WO | WO 98/11520 | 3/1998 |

* cited by examiner

*Primary Examiner*—Michael G. Lee
*Assistant Examiner*—Ahshik Kim
(74) *Attorney, Agent, or Firm*—Synnestvedt & Lechner LLP

(57) ABSTRACT

A self-service checkout system allowing customers to perform purchasing functions while ensuring payment and preventing theft. The system's payment card reader and price scanner are operable by the customer to read product tags including price and/or serial number data and a desensitizable security tag. The product tag is inserted into a slot in a housing for the price scanner and desensitizer that shields a desensitizing effect from any security tags outside the housing. The system desensitizes the security tag only if a charge to the payment card is approved. A detector is positioned near the store exit to detect items exiting the store which have not been released from the security system. Serial number information from the product tag may be read as the items leave the store and compared with a database of serial numbers of purchased items to determine whether to activate an alarm.

17 Claims, 9 Drawing Sheets

CUSTOMER'S PERSPECTIVE

PAYMENT SUBSYSTEM'S PERSPECTIVE

SECURITY SUBSYSTEM'S PERSPECTIVE

SELF-SERVICE CHECKOUT

RELATED APPLICATION

This application claims the benefit of U.S. Provisional Application No. 60/140,395, filed Jun. 22, 1999.

FIELD OF THE INVENTION

This invention relates generally to a system and method for self-service checkout of merchandise by a customer at a retail store and particularly to a system and method for self-service checkout wherein accurate merchandise pricing and payment therefor are ensured while providing security against unauthorized removal of merchandise from the retail store.

BACKGROUND OF THE INVENTION

The marketplace is now replete with self-service retail stores, such stores as grocery stores, drug stores, department stores and the like. In such stores, merchandise is typically arranged about the store for selection by a customer. The customer serves himself or herself (collectively referred to hereinafter as a person of the male gender) by selecting items of merchandise from displays and transporting them with him as he moves about the store. Once a customer has completed his selections, he takes his selected merchandise to a centrally-located sales terminal where one of the store's cashiers performs the steps necessary to complete the purchase transaction, i.e., "checkout".

In such a store, the cashier serves several important functions. The cashier's primary function is to enter the price of each item into the cash register, which computes the total cost of all selected merchandise. This is typically achieved by scanning a price tag affixed to each item of merchandise. In a typical arrangement, the scanner comprises an optical scanner capable of reading information encoded in bar code indicia printed on the price tag. This information is then interpreted by the scanner, the cash register or another piece of equipment to ascertain the price of the item to which the price tag is attached, as is well known in the art.

The cashier's secondary function is to accept payment for the selected merchandise. Payment is typically received in the form of cash, check, debit card or credit card. While accurate payment by cash or check is typically verified visually by the cashier, payment by debit and credit cards is verified electronically by the cash register and/or associated equipment. As is known in the art, debit and credit cards are provided with a machine-readable magnetic stripe containing information necessary to complete the purchase, such as a customer's account number. In many arrangements, the cashier swipes the card through a magnetic stripe reader to enter such information into the cash register. In some stores, such as grocery stores, the cashier simply guides the customer to swipe his own payment card through a magnetic stripe reader after the cashier determines the purchase amount by scanning the selected merchandise. In either case, the cash register or related equipment seeks electronic approval for the transaction by communicating with an electronic payment network, as is known in the art. The transaction is completed if approval is received.

Many retail stores, particularly department stores, are provided with security systems to prevent the unauthorized removal of merchandise from the store. In such a store, the cashier serves a tertiary function, namely, to release the item from the store's security system.

One class of security systems responds by activating an anti-theft device, such as an alarm, when the security system detects an activated security tag leaving the store. In some instances, particularly in the case of soft goods, a removable non-deactivatable security tag is affixed to each item. In those instances, the cashier has access to a specialized tool adapted for removing the security tag from the item and an alarm sounds if a security tag is detected leaving the store. In other instances, a deactivatable security tag, such as a magnetic tag, is affixed to each item. In those instances, the cashier has access to a specialized device adapted for desensitizing the security tag, e.g., by demagnetizing it. The security tag remains attached to the item and an alarm sounds only if a magnetized security tag is detected leaving the store.

Another class of security systems employs a non-deactivatable security tag which is designed to remain on the security as it leaves the store. After the purchase of an item, the cashier scans the security tag of the item to release it from the security system. The security system detects the item as it leaves the store and permits the item to leave the store uneventfully if the security system is aware that the item has been paid for. If the item identified by the security tag has not been approved for removal from the store, e.g., because the item has not been purchased, an anti-theft device is activated. One such arrangement, employing a radio frequency identification (RFID) tag, is disclosed in U.S. Pat. No. 5,745,036 to Clare, the disclosure of which is hereby incorporated by reference.

The problems of self-service retail shopping with cashier-based checkout are well known. From the customer's viewpoint, such an arrangement is undesirable because there are few cashiers and checkout stations relative to the number of shoppers. Additionally, the security systems described above are undesirable because they require an extra step on the part of the cashier, namely, removing, desensitizing, or scanning the security tag in addition to scanning the price tag. The extra step lengthens the checkout process and introduces another opportunity for human error or theft (e.g., releasing an item from the security system without ensuring payment therefor). Such an arrangement results in long lines at the checkout stations. Accordingly, the checkout procedure is a bottleneck in the shopping process.

From the retailer's viewpoint, a larger number of checkout stations consumes a larger amount of precious retail floor space and results in additional equipment and labor costs. Accordingly, the retailer's goal is to provide a minimum number of checkout stations, which in turn has a tendency to exacerbate the problems the customer typically perceives, while meeting the customers' desire for swift checkout. While some arrangements have been suggested to reduce the number of required cashiers and/or to permit self-service checkout, see, e.g., U.S. Pat. Nos. 5,013,896 to Cho et al., 5,083,638 to Schneider, 5,497,852 to Colling, Jr. et al. and 5,752,582 to Hayward, none achieves these goals satisfactorily, at a reasonable cost. Additionally, none achieves these goals while ensuring proper payment for purchased merchandise and adequate security, i.e., ensuring that the customer releases from the security system only those items for which he has paid.

Accordingly, it is an object of the present invention to provide a system for self-service retail checkout which eliminates or reduces the need for cashiers by permitting a customer to perform the checkout procedure.

It is another object of the present invention to provide a system for retail checkout which ensures proper payment for selected items of merchandise.

It is yet another object of the present invention to provide a system for retail checkout which provides adequate security against unauthorized removal of merchandise from a store.

It is a further object of the present invention to provide a system for retail checkout which integrates a payment and a security system.

It is yet a further object of the present invention to provide a system for retail checkout in which a single operation is required to ensure proper payment and to provide security against unauthorized removal of merchandise.

It is yet a further object of the present invention to provide a method for retail checkout which achieves these and other objects.

SUMMARY OF THE INVENTION

In broad terms, the invention provides a system and method of self-service checkout. An exemplary system in accordance with the present invention is configured for reading a product tag including a desensitizable security tag. The system includes a housing substantially closed to the environment. The housing defines a slot opening to an internal bay dimensioned for receiving the product tag, the housing being configured for shielding a desensitizing effect from any security tags outside the housing. A price scanner is positioned within the housing for reading price information encoded on the product tag of an item while the product tag is positioned in the bay. The price scanner is capable of transmitting the price information. The system also includes a payment card reader for reading account information stored on a payment card. The payment card reader is capable of transmitting the account information. The system further includes a payment unit for receiving the price information from the price scanner, for communicating with an electronic payment network to seek approval of a charge to the payment card, and for transmitting an activation signal upon receipt of approval of the charge. A selectively activatable desensitizer is provided for desensitizing a security tag of a product tag while the product tag is positioned within the bay of the housing. The desensitizer is configured to be activated upon receipt of the activation signal transmitted from the payment unit. In this manner, product tags inserted into the bay of the housing are scannable for price and the desensitizer's desensitizing effect is limited to a corresponding security tag of the product tag scanned for price.

Methods for performing a self-service checkout transaction using such a system is also provided.

DETAILED DESCRIPTION

The present invention relates to a system and method for self-service checkout of merchandise in a retail store. The present invention is ideally suited to self-service retail stores, particularly stores such as department stores which already include price and security tags on all or nearly all merchandise. However, the invention may be easily implemented in any store by modifying store practices to conform to the invention.

Figure 1:
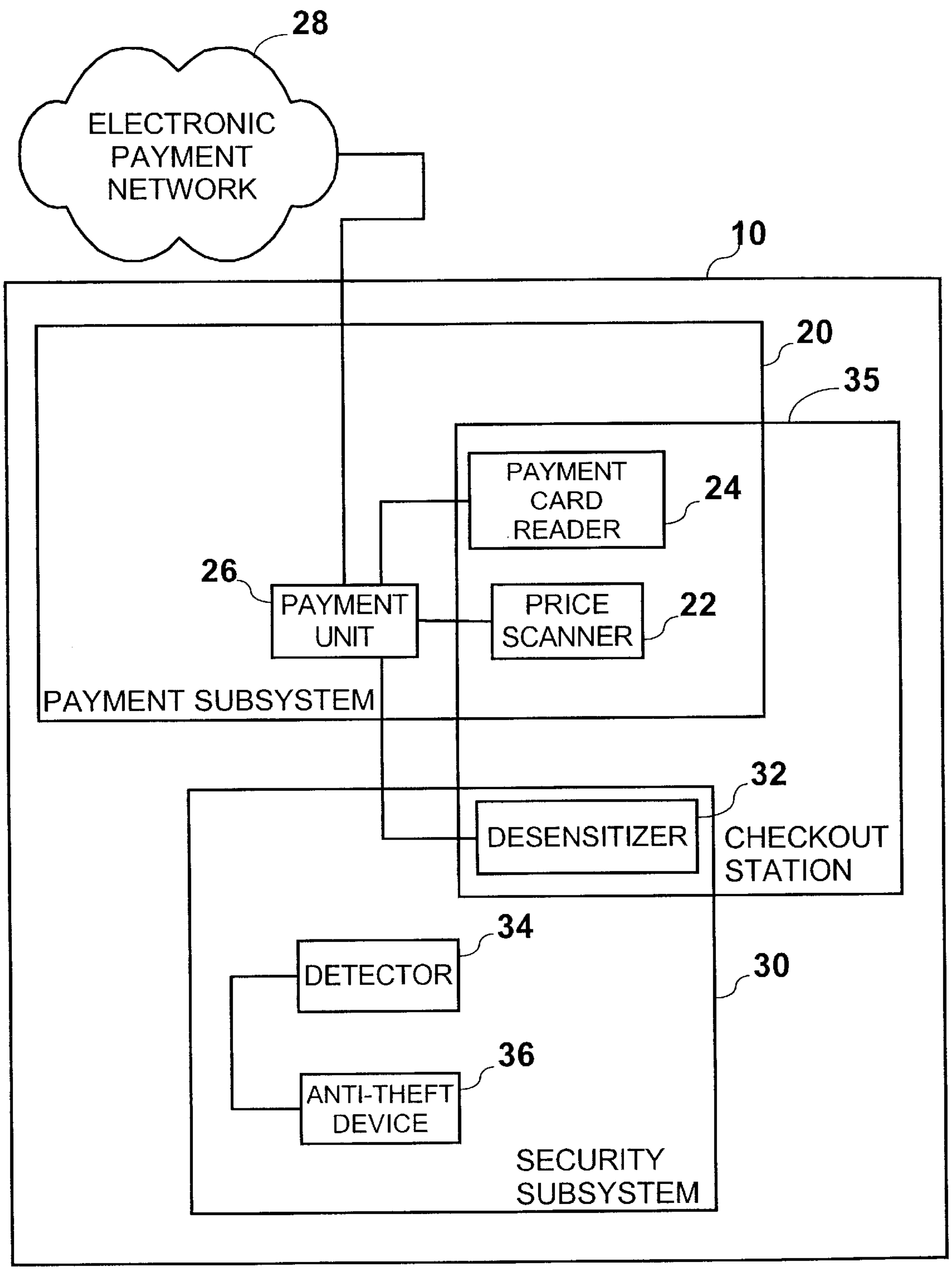
FIG. 1 is a block diagram schematically showing a self-service checkout system in accordance with a first embodiment of the present invention.

Referring now to FIG. 1, a system 10 for self-service checkout in accordance with a first embodiment of the present invention is shown schematically. In the preferred embodiment, the system 10 comprises two subsystems, namely, a payment subsystem 20 and a security subsystem 30. The payment subsystem 20 preferably comprises three main components, namely, a price scanner 22, a payment card reader 24, and a payment unit 26. While these components are preferably separate pieces of interconnected equipment, some or all of these components may be integrated into a single piece of equipment.

The price scanner 22 is capable of reading product information from a product tag (not shown) attached to an item of merchandise. While the price scanner 22 may be of any suitable type, it is preferable that the price scanner 22 is of the optical type. Optical scanners capable of reading bar code indicia are well known in the art and described in U.S. Pat. No. 4,578,571 to Williams, the disclosure of which is hereby incorporated by reference. The price scanner 22 is capable of transmitting information stored in the bar code indicia to a payment unit 26 in electronic communication therewith. In accordance with the invention, a product tag is attached to each item of the store's merchandise and each product tag is provided with bar code indicia indicating a price of the item to which the product tag is attached.

The payment card reader 24 is of the type generally known in the art. The payment card reader 24 is provided with a magnetic stripe reader for reading account information and other pertinent data stored on a magnetic stripe of a customer's debit or credit payment card. In the example shown in FIG. 1, the payment card reader 24 is in electronic communication with the payment unit 26 and is capable of transmitting account number information read from the customer's payment card to the payment unit 26. In an alternate embodiment, the payment card reader 24 may be capable of transmitting account number and charge information directly to an electronic payment network 28. In another alternate embodiment, a payment device may be substituted for or supplement the payment card reader, the payment device being capable of accepting other forms of payment, e.g., a bill reader for accepting cash as is well known for use with vending machines, etc.

The payment unit 26 is capable of receiving price information of an item of merchandise from the price scanner 22 and electronically communicating with an electronic payment network 28 for approval of a charge to an account associated with a payment card, as is well known in the art. Importantly, the payment unit 26 is also capable of activating a desensitizer 32 of the security subsystem 30 when approval of a charge is received from the electronic payment network 28.

The security subsystem 30 comprises three main components, namely, a desensitizer 32, a detector 34 and an anti-theft device 36. The detector 34 is preferably stationed near an exit of the store to detect sensitized security tags of items as they are carried out of the store by a customer and pass through a detection zone monitored by the detector 34. An item detected within the detection zone is herein termed a "zone item", the detector detecting the sensitized security tag of the zone item.

Detectors and desensitizers suitable for this purpose are well-known in the art. Such detectors frequently employ magnetic technology to detect a sensitized, i.e., magnetized, security tag which may be selectively desensitized to release a purchased item from the security subsystem. The desensitizer is equipped to degauss, i.e., demagnetize, a security tag. The detector 34 is capable of activating an anti-theft device 36 in the event that a sensitized security tag is detected within the detection zone. The anti-theft device 36 may alternately comprise, for example, an audible alert or alarm, a video surveillance system, a visible alert, or a combination thereof.

In some embodiments, the desensitizer 32 may be located remotely from the price scanner 22, i.e., elsewhere in the checkout station. In the preferred embodiment, the price scanner 22 and desensitizer 32 are mounted within a housing (not shown) of the checkout station and each item is provided with a product tag having both the price indicia and a security tag thereon. In such an arrangement, the product tag is inserted in a slot (not shown) in the housing and positioned such that the bar code indicia may be read by the price scanner 22 internal to the housing. Once approval is received, the desensitizer 32 is activated to demagnetize the security tag. The housing is magnetically shielded to prevent desensitization of any security tags outside the housing and the housing is equipped with a clamp to prevent removal of product tags during the checkout process or sensors to prevent completion of the checkout process if a product tag is removed after being scanned for price and before desensitization. Additionally, the slot configuration and/or sensors within the housing prevent insertion of more than one product tag in a single bay in the slot at any one time. However, the slot may be elongated and have multiple bays, each for receiving a single product tag. Such a configuration may be used to checkout many items contemporaneously. In one arrangement, several product tags are inserted into several bays within the slot, each product tag is scanned for price, and then all product tags are desensitized simultaneously once approval for all items is received. In an alternate arrangement, the product tags for which approval was not received are discharged from the housing and the remaining product tags are desensitized. Additionally, persons may be stationed near the store exits to provide shopping bags to customers who have completed the checkout process, such persons bagging the items while verifying that each item properly bears a product tag. These measures prevent a customer from releasing an item from the security subsystem without paying for it.

Figure 2:
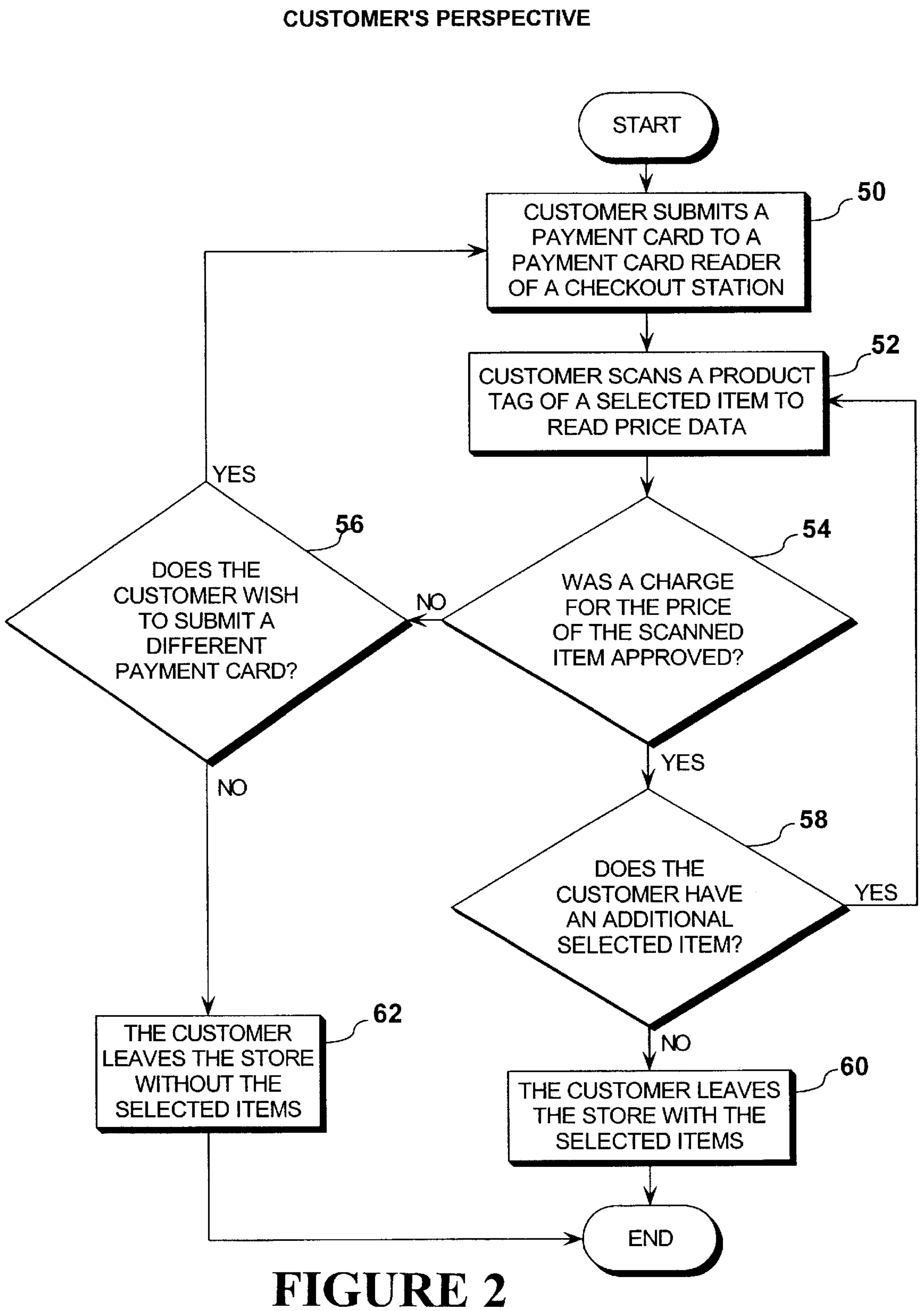
FIG. 2 is a flow diagram of a self-service checkout transaction in accordance with the present invention from the customer's perspective.

Referring now to FIG. 2, a flow diagram of a self-service checkout transaction in accordance with the present invention is shown from the customer's perspective. The customer first browses the self-service retail store and selects and collects items he wishes to purchase. After completing his selections, the customer brings his collection of selected items to a self-service checkout station located within the store. A self-service checkout station 35 in accordance with the present invention comprises at least a price scanner 22, a payment card reader 24 and a desensitizer 32 as shown schematically in FIG. 1. These elements are preferably arranged in a kiosk as discussed below with reference to FIG. 9.

As shown in FIG. 2, a customer may complete the self-service checkout transaction as follows. The customer first submits a payment card to the payment card reader 24, as shown at step 50. The customer then scans the bar code indicia containing the price of the item product tag of a selected item, preferably by inserting the product tag of the item into a housing containing the price scanner 24 as shown at step 52. The customer then determines whether a charge for the price of the scanned items has been approved, as shown at step 54. Preferably, the customer is first presented with the price of the scanned item and an opportunity to accept or reject the purchase, e.g., using a visual display such as a CRT, LCD or LED display and "accept/yes" and "reject/no" buttons. If, after accepting the purchase, the charge to his payment card is approved, the customer is preferably further presented with a signal so indicating, for example, an audible signal, a visual signal, or a message presented on a visual display. If the charge to the payment card is not approved, the customer is given the option of submitting a different payment card, as shown at step 56. If the customer submits a different payment card, as shown at step 50, the item is scanned again as shown at step 52 and the customer again determines whether the charge has been approved, as shown at step 54. In an alternate embodiment, it is not necessary to rescan the product tag in step 52.

If the customer has additional selected items which he has not yet scanned, he repeats the scanning process of step 52, as shown at step 58. Once all charges to the payment card have been approved, the customer leaves the store with the selected items by passing through a detection zone adjacent a store exit, as shown at step 60. The security subsystem 30 allows the customer and the purchased items to leave the store uneventfully because the security tags of the purchased items have been desensitized, without interaction by or perhaps knowledge of, the customer. If the customer's charges to the payment card were not approved and he chose not to submit a different payment card, he leaves the store without the selected items, as shown at step 62.

Figure 3:
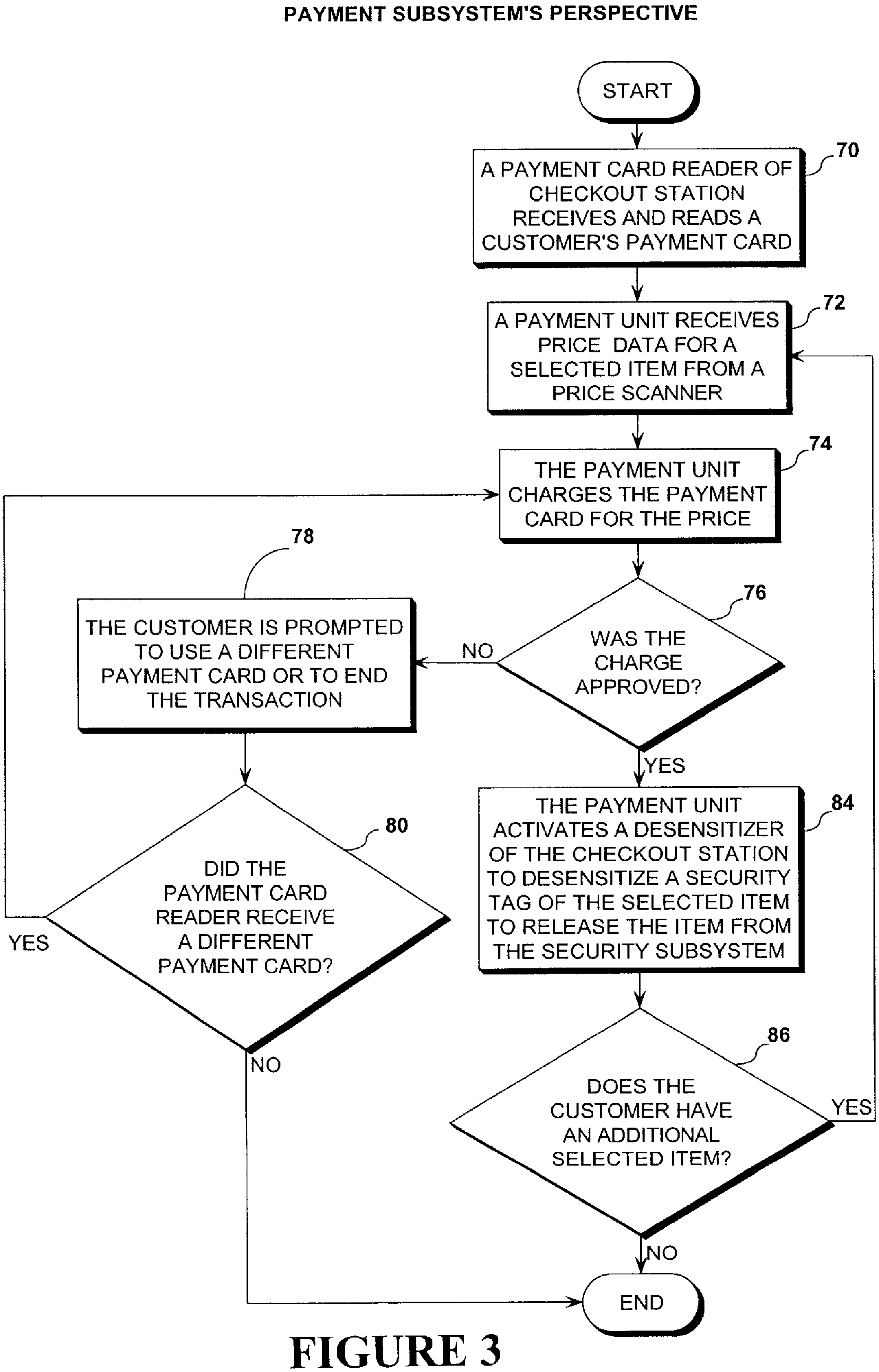
FIG. 3 is a flow diagram of a self-service checkout transaction in accordance with the present invention from the payment subsystem's perspective.

Referring now to FIG. 3, a flow diagram of a self-service checkout transaction in accordance with the present invention from the payment subsystem's 20 perspective. First, a payment card reader 24 receives a customer's payment card and reads the card to determine an account number, etc. associated with the payment card, as shown at step 70. The payment unit 26 then receives price information of a selected item as the customer scans price indicia on a product tag attached to his selected item using the price scanner 22 connected to the payment unit 26, as shown at step 72. The payment unit 26 may add applicable taxes, etc., if appropriate, to determine a total. The payment unit 26 then attempts to charge the total to the customer's account number by communicating with an electronic payment network 28 to seek approval for the charge as is well known in the art for debit and credit cards, as shown at step 74. The payment unit 26 determines whether the charge was approved, as shown at step 76. If not, the customer is prompted to submit a different payment card or to end the transaction, as shown at step 78. While this may be performed in any suitable fashion by any device, in the preferred embodiment, the payment unit 26 is provided with a visual display for this purpose. It is then determined whether the payment card reader 24 received a different payment card, as shown at step 80. If so, the payment unit 26 attempts to charge the total to the different payment card, as shown at step 74. If not, the transaction ends, as shown at step 82.

If the charge to the payment card was approved, the payment unit 26 activates the desensitizer 32 of the checkout station to desensitize the security tag of the selected item, as shown at step 84, to release the item from the store's security subsystem 30. The desensitizer 32 is located within the housing of the checkout station such that the desensitizer 32 is capable of desensitizing the security tag of an item while the product tag of the item is still in the housing for the purpose of being scanned for price. Although the approval for the charge of the scanned item must be received before desensitizing the item's security tag, these operations occur sequentially with little delay. In this manner, the security tag may be desensitized without intervention by or knowledge of the customer. By integrating the payment subsystem 20 with the security subsystem 30, a self-service checkout system in accordance with the present invention helps to ensure that an item may not be released from the security subsystem until payment therefor is received.

It is determined whether the customer has an additional item, e.g., by pressing a "continue" button, as shown at step 86, and if so, the payment subsystem 20 receives the price of the next selected item, as shown at step 72, and the process repeats. If not, the transaction ends, as shown at step 82. This may include providing the customer with a receipt, etc.

Figure 4:
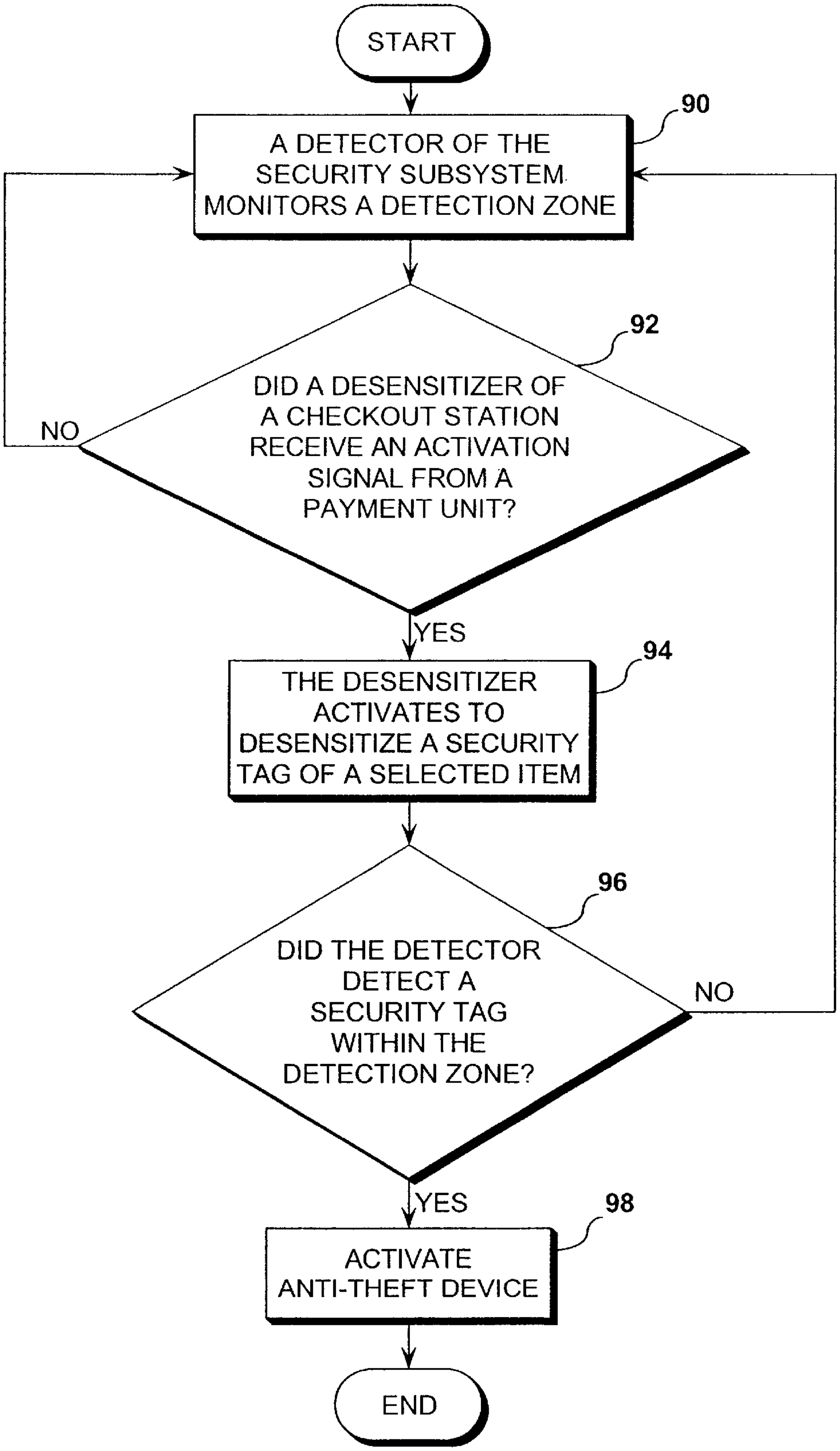
FIG. 4 is a flow diagram of a self-service checkout transaction in accordance with the present invention from the security subsystem's perspective.

Referring now to FIG. 4, a self-service checkout transaction in accordance with the present invention is shown from the security subsystem's 30 perspective. In the example of FIG. 4, it is shown for illustrative purposes that a desensitizer 32 of the security subsystem 30 receives an activation signal from a payment unit 26 before detecting a security tag within the detection zone. However, it should be understood that in the event of attempted theft of an item, these steps could occur in reverse order.

A detector 34 of the security subsystem 30 continuously monitors a detection zone adjacent to a store exit, as shown at step 90. If the desensitizer 32 does not receive an activation signal from a payment unit 26, the detector continues to monitor the detection zone, as shown at steps 90 and 92. If the desensitizer 32 receives an activation signal from the payment unit 26, the desensitizer 32 activates to desensitize the security tag of a purchased selected item, as shown at 94. If the detector 34 does not detect a security tag within the detection zone, it continues to monitor the detection zone, as shown at steps 96 and 98. If the detector does detect a sensitized security tag within the detection zone, the detector 34 transmits a signal to activate an anti-theft device, as shown at step 98. In such a case, security personnel may be alerted and respond to investigate the situation. If the desensitizer 32 has desensitized the security tag, the security tag will not be detected by the detector 34 and the items of merchandise will be permitted to leave the store uneventfully.

Another embodiment of the invention employs a non-deactivatable security tag and a separate price tag. The price tag is scanned by a customer at a checkout station, using either a scanner mounted in a housing or a handheld scanner. The non-deactivatable security tag is not removed at the checkout station. Rather, the security tag is removed by store employees stationed near the store exits at the time the employees dispense shopping bags, e.g., after inspecting a receipt, etc. Accordingly, such a system resembles the system shown in FIG. 1 but lacks a desensitizer. The flow of the transaction from the customer's perspective is the same as shown in FIG. 2, except that the security tag is removed by a store employee before the customer leaves the store. The flow of the transaction from the payment subsystem's perspective is the same as shown in FIG. 3 except step 84 is omitted. The flow of the transaction from the security subsystem's perspective is the same as in FIG. 4 except steps 92 and 94 are omitted.

Figure 5:
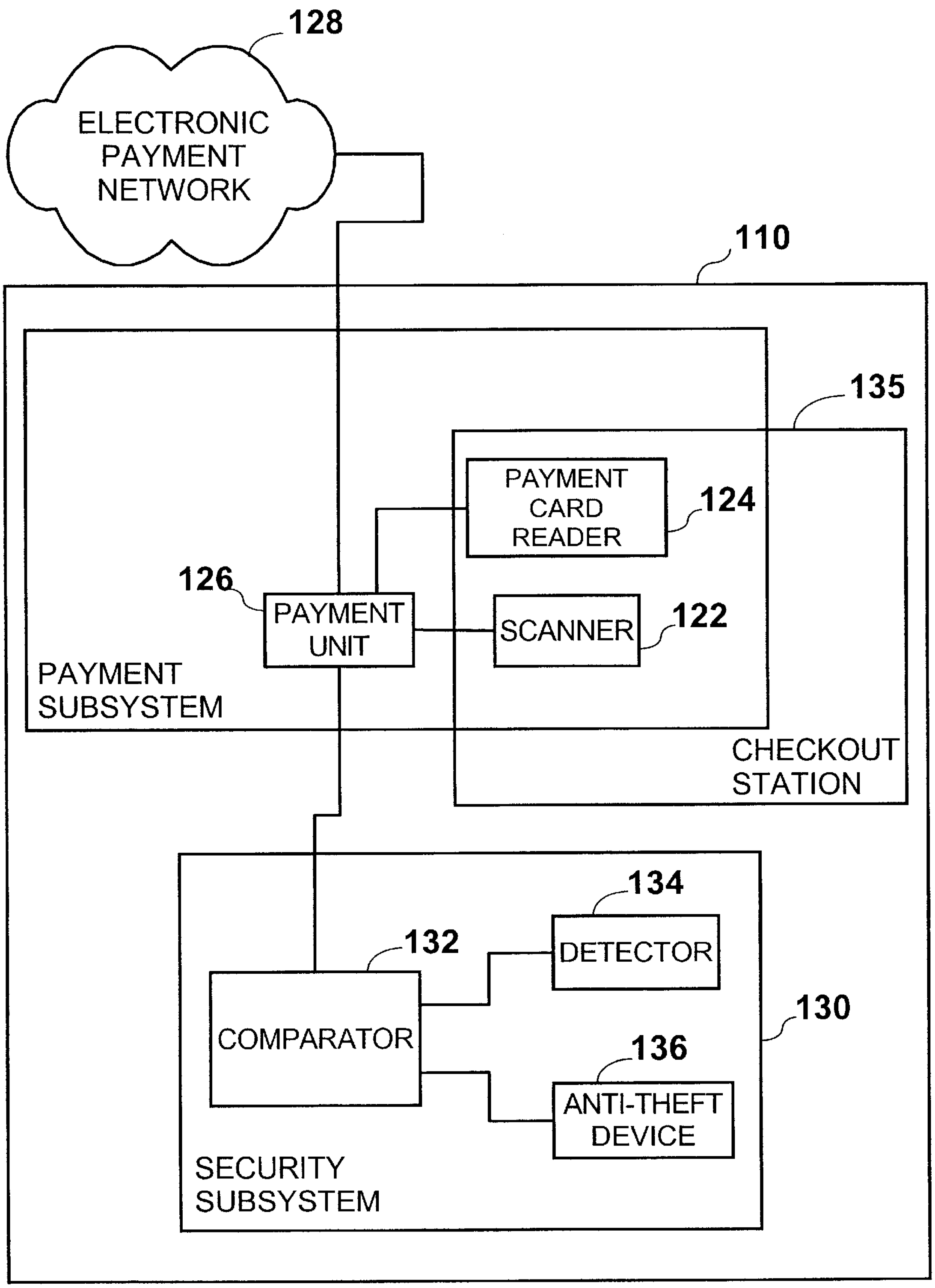
FIG. 5 is a block diagram schematically showing a self-service checkout system in accordance with an alternate embodiment of the invention employing radio frequency technology.

In another embodiment, a non-deactivatable security tag and radio frequency technology is used. Such an embodiment is described below. Referring now to FIG. 5, an alternate system 110 for self-service checkout in accordance with the present invention is shown schematically. The system 110 comprises two subsystems, namely, a payment subsystem 120 and a security subsystem 130. The payment subsystem 120 comprises three main components, namely, a scanner 122, a payment card reader 124, and a payment unit 126. While these components are preferably separate pieces of interconnected equipment, some or all of these components may be integrated into a single piece of equipment.

The scanner 122 is of the type generally known in the art and is preferably of the optical type and is capable of reading bar code indicia described above. Importantly, the scanner 122 must be capable of reading product information from a product tag (not shown) attached to an item of merchandise. In accordance with this embodiment of the invention, a product tag is attached to each item of the store's merchandise and each product tag is provided with bar code indicia indicating a price and a serial number of the item to which the product tag is attached. In one embodiment, the price and the serial number information are transmitted from the scanner to the payment unit 126 as shown in FIG. 5. However, in an alternate embodiment, the serial number may be transmitted directly to another piece of equipment or to the security subsystem 130, as discussed further below.

The payment card reader 124 is also of the type generally known in the art and described above. In the example shown in FIG. 5, the payment card reader 124 is in electronic communication with the payment unit 126 and is capable of transmitting account number information read from the customer's payment card to the payment unit 126. In an alternate embodiment, the payment card reader 124 may be capable of transmitting account number and charge information directly to an electronic payment network 128. In another alternate embodiment, a payment device may be substituted for or supplement the payment card reader, the payment device being a device capable of accepting other forms of payment, e.g., a bill reader for accepting cash as is well known for use with vending machines, etc.

The payment unit 126 is of the type generally known in the art. Importantly, the payment unit 126 is capable of receiving price information of an item of merchandise from the scanner 122 and adding price information to determine a total price for a collection of scanned items. In one embodiment, the payment unit 126 is further capable of receiving serial number information transmitted from the scanner 122 and transmitting the serial number information electronically to the security subsystem 130. In an alternate embodiment, a different piece of equipment may be so capable. In the example shown in FIG. 5, the payment unit 126 is capable of electronically communicating with an electronic payment network 128 for approval of a charge to a payment card, as is well known in the art. In an alternate embodiment, for example, the payment unit 126 may be capable of transmitting a charge total to the payment card reader 124 and the payment card reader 124 may be capable of communicating with the electronic payment network 128. The checkout station 135 preferably comprises the scanner 122 and payment card reader 124 and may alternatively further comprise the payment unit 126. The checkout station may be arranged in a kiosk similar to that shown in FIG. 9.

The security subsystem 130 comprises three main components, namely, a comparator 132, a detector 134 and an anti-theft device 136. The detector 134 may be stationed near an exit of the store to detect serial number of item as they are carried out of the store by a customer and pass through a detection zone monitored by the detector 134, the detector detecting the serial number(s) of the zone item(s). Detectors suitable for this purpose are well-known in the art. Such detectors frequently employ radio-frequency technology to transmit a signal which, when received by a specially designed resonant security tag, causes a unique or semi-unique signal to be returned to the detector. Examples of such systems are described in U.S. Pat. Nos. 5,446,447 to Carney et al., 5,430,441 to Bickley et al., 5,347,263 to Carroll et al., and 5,745,036 to Clare, which are incorporated herein by reference. In this embodiment, the security subsystem 130 employs radio-frequency technology and each product tag further comprises, in addition to bar code indicia containing price and serial number information, a resonant radio frequency identification (RFID) security tag capable of transmitting to the detector 134 a signal identifying the item's serial number.

The comparator 132 comprises a microprocessor, memory and software capable of comparing the zone item's serial number received from the detector 134 with serial number(s) of purchased item(s) transmitted from the payment subsystem 120. The serial number(s) of purchased item(s) received from the payment subsystem 120 are stored in a database accessible to the comparator 132. In one embodiment, the database may be stored remotely from the comparator 132. In another embodiment, the database is stored in a memory of the comparator 132. The comparator 132 is capable of transmitting a signal to an anti-theft device 136 connected thereto in the event that the serial number of a zone item does not match any serial number in the database of serial numbers of purchased items. The anti-theft device 136 may alternately comprise, for example, an audible alarm, a video surveillance system, a visible alert, or a combination thereof.

Figure 6:
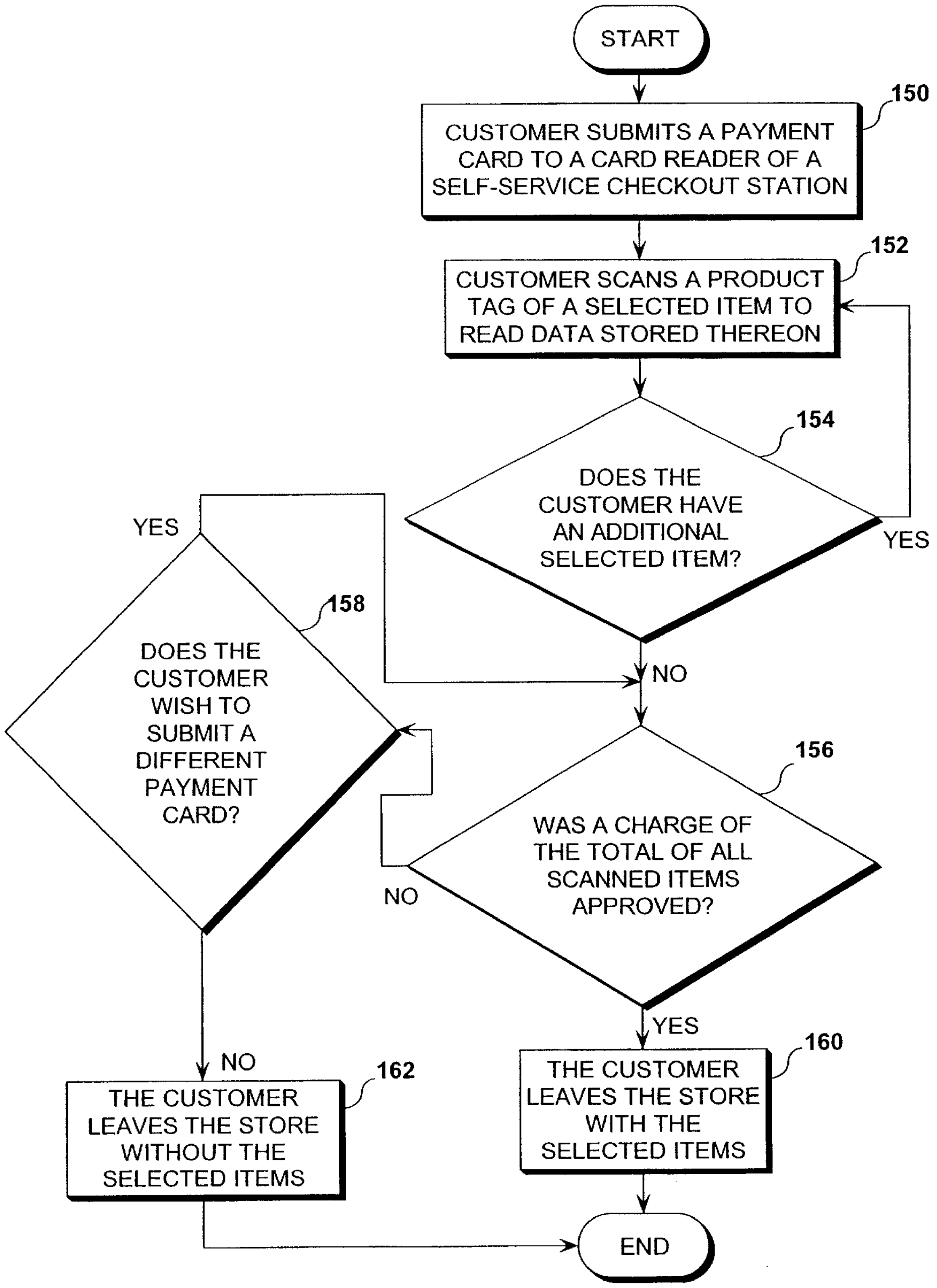
FIG. 6 is a flow diagram of a self-service checkout transaction in accordance with an alternate embodiment of the invention employing radio frequency technology from the customer's perspective.

Referring now to FIG. 6, a flow diagram of a self-service checkout transaction in accordance with this embodiment of the present invention is shown from the customer's perspective. The customer first browses the self-service retail store and selects and collects items he wishes to purchase. After completing his selections, the customer brings his collection of selected items to a self-service checkout station located within the store.

As shown in FIG. 6, a customer completes the self-service checkout transaction as follows. The customer first submits a payment card to the card reader 124, as shown at step 150. The customer then scans a product tag of a selected item by passing an optical scanner portion of the scanner 124 over a bar code imprinted on the product tag, as shown at step 152. This single scanning operation enters both the price and serial number information into the system for each item of merchandise. If the customer has additional selected items which he has not yet scanned, he repeats the scanning process of step 152, as shown at step 154. After the customer has scanned all of his selected items, he determines whether a charge for the total of all of his scanned items has been approved, as shown at step 156. The customer is first presented with a total price for all scanned items and an opportunity to accept or reject the total. If, after accepting the total, the charge to his payment card has been approved, the customer is further presented with a signal so indicating, for example, an audible signal, a visual signal, or a message presented on a visual display. If the charge to the payment card was not approved, the customer is given the option of submitting a different payment card, as shown at step 158. If the customer submits a different payment card, the charge is submitted to the different payment card and the customer again determines whether the charge has been approved, as shown at step 156. Once the charge to the payment card has been approved, the customer leaves the store with the selected items by passing through a detection zone adjacent to a store exit as shown at step 160. If the customer's charge to the payment card was not approved and he chooses not to submit a different payment card, he leaves the store without the selected items, as shown at step 162.

Figure 7:
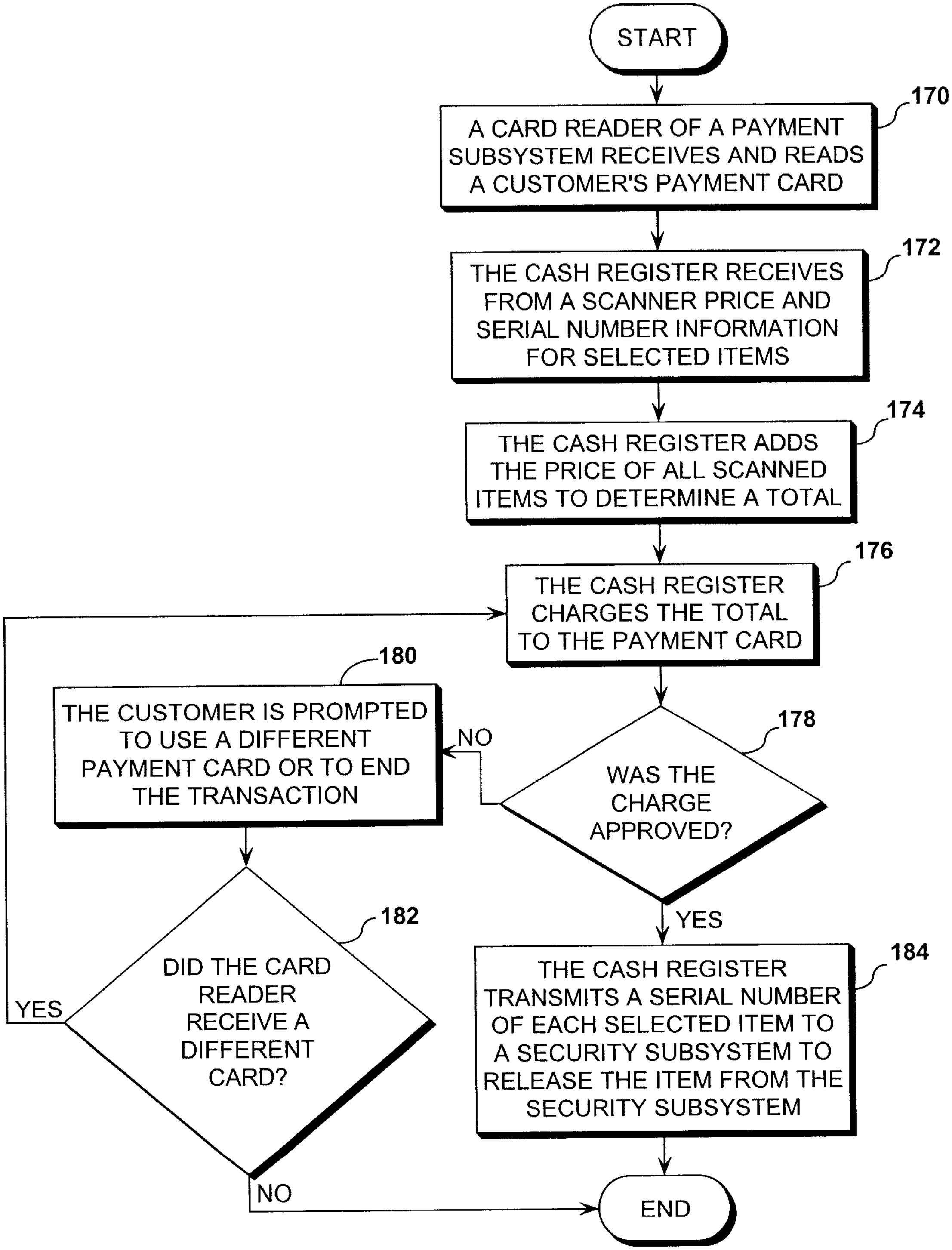
FIG. 7 is a flow diagram of a self-service checkout transaction in accordance with an alternate embodiment of the invention employing radio frequency technology from the payment subsystem's perspective.

Referring now to FIG. 7, a flow diagram of a self-service checkout transaction in accordance with the present invention is shown from the payment subsystem's 120 perspective. First, an automated payment card reader 124 receives a customer's payment card and reads the card to determine an account number associated with the payment card, as shown at step 170. The payment unit 126 then receives price and serial number information of selected items as the customer scans product tags attached to his selected items with a scanner 122 connected to the payment unit 126, as shown at step 172.

Importantly, the payment unit 126 receives the price and serial number information of each item contemporaneously as the result of a single scanning operation on the part of the customer. This provides several advantages to the retailer. First, it ensures accurate entry of price and serial number information into the checkout system by removing it from the customer's control; it's automated. Second, the price and serial number information is entered contemporaneously into the checkout system. This provides an additional advantage to the retailer in that it reduces theft by preventing a customer from releasing an item of merchandise from the security system without ensuring payment therefor. In the preferred embodiment, this is achieved by encoding both the price and the serial number information into a single bar code. In an alternate embodiment, the price and serial number information may not be encoded in a single bar code, however, it is important that the system provide for scanning of the price and serial number information in a single or substantially contemporaneous scanning operation.

The payment unit 126 then adds the price of all scanned items to determine a total, as shown at step 174. The payment unit 126 may add applicable taxes, if appropriate, to determine a total. The payment unit then attempts to charge the total to the customer's account number by communicating with an electronic payment network to seek approval for the charge as is well known in the art for debit and credit cards, as shown at step 176. The payment unit 126 determines whether the charge was approved, as shown at step 178. If not, the customer is prompted to submit a different payment card or to end the transaction, as shown at step 180. While this may be performed in any suitable fashion by any device, in one embodiment, the payment unit 126 is provided with a display for this purpose. It is then determined whether the payment card reader 124 received a different payment card, as shown at step 182. If so, the payment unit 126 attempts to charge the total to the different payment card, as shown at step 176. If not, the transaction ends, as shown at step 186.

If the charge to the payment card is approved, the payment unit 126 transmits a serial number of each selected item to the security subsystem 130, as shown at step 184, to release the item identified by that serial number from the store's security subsystem 130. By integrating the payment 120 and security subsystems 130, a system in accordance with the present invention ensures that an item may not be released from the security subsystem until payment therefor is received. After releasing the item(s) from the security subsystem 130, the transaction ends, as shown at step 186. This may include providing the customer with a receipt, etc. The serial numbers are stored in a database of purchased items stored at the comparator 132.

Figure 8:
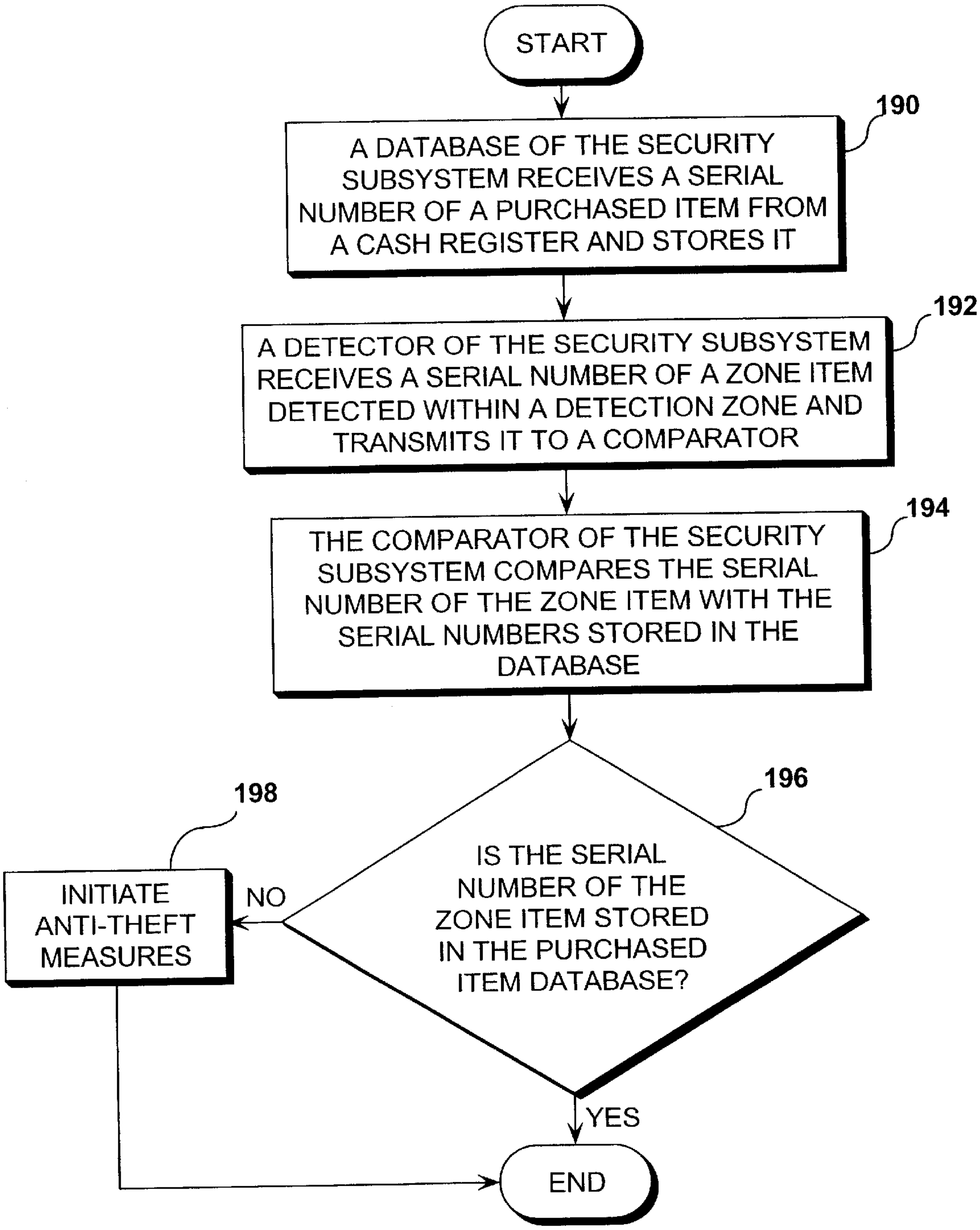
FIG. 8 is a flow diagram of a self-service checkout transaction in accordance with an alternate embodiment of the invention employing radio frequency technology from the security subsystem's perspective.

Referring now to FIG. 8, a self-service checkout transaction in accordance with the present invention is shown diagrammatically from the security subsystem's 130 perspective. In the example of FIG. 8, it is shown for illustrative purposes that a database of the security subsystem 130 first receives a serial number of a purchased item from a payment unit 126, as shown at step 190. However, it should be understood that step 192 could, in a theft situation, occur before step 190. Then, a detector 134 of the security subsystem 130 receives a serial number of a zone item, and transmits the serial number to the comparator 132, as shown at step 192. The comparator 132 then compares the serial number of the zone item with the serial numbers stored in the database, as shown at step 194. The comparator 132 determines whether the serial number of the zone item matches a serial number in the database, as shown at step 196. If not, the comparator 132 transmits a signal to the anti-theft device, as shown at step 198. In such a case, security personnel may be alerted and respond to investigate the situation. If the comparator 132 identifies a match, the customer and merchandise are permitted to leave the store uneventfully.

Figure 9:
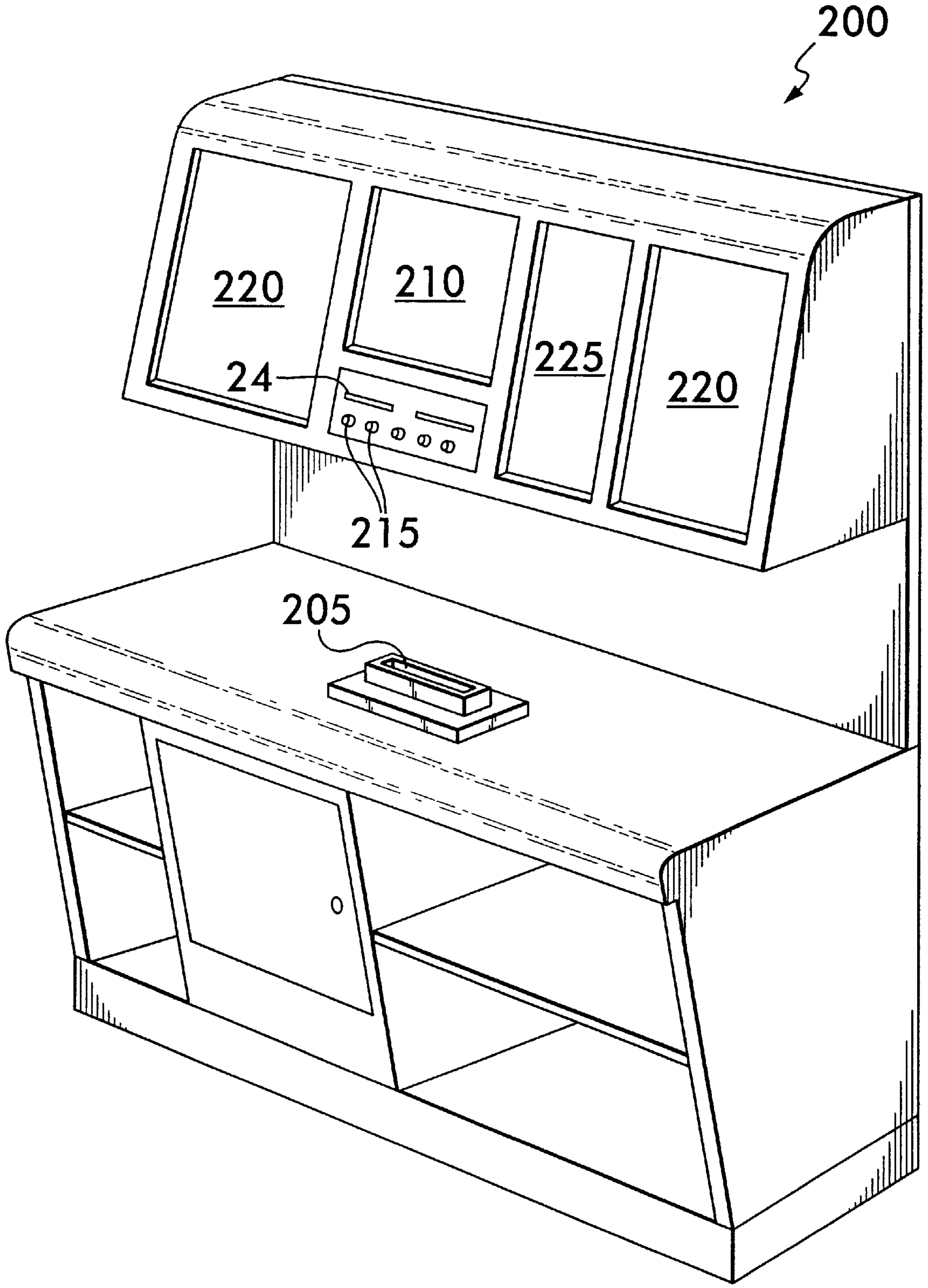
FIG. 9 is a perspective view of an example of a kiosk including a self-service checkout station in accordance with the present invention.

One example of a checkout station kiosk 200 is shown in FIG. 9. The checkout station kiosk 200 shown in FIG. 9 is equipped with a payment card reader 24, a price scanner (not shown), and a desensitizer (not shown). The price scanner and desensitizer are mounted within a housing (not shown) in communication with a slot 205 for receiving a product tag. The kiosk 200 further comprises a visual display 21, buttons 215 for monitoring a transaction, advertisement displays 220, and instructions for operation of the checkout station 225. In an alternate embodiment, the kiosk may further comprise the payment unit 26 and/or additional checkout stations.

Having thus described particular embodiments of the invention, various alterations, modifications, and improvements will readily occur to those skilled in the art. For example, the functions performed may alternatively be performed by equipment other than as described herein, the importance being the function performed, not the equipment performing the function. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A system for self-service checkout of merchandise bearing a product tag including a desensitizable security tag by a customer at a retail store, the system comprising:

a housing substantially closed to the environment, the housing defining a slot opening to an internal bay dimensioned for receiving the product tag, the housing being configured for shielding a desensitizing effect from any security tags outside the housing;

a price scanner positioned within the housing for reading price information encoded on a product tag of an item while the product tag is positioned in the bay, the price scanner being capable of transmitting the price information;

a payment card reader for reading account information stored on a payment card, the payment card reader being capable of transmitting the account information;

a payment unit for receiving the price information from the price scanner, for communicating with an electronic payment network to seek approval of a charge to the payment card, and for transmitting an activation signal upon receipt of approval of the charge; and a selectively activatable desensitizer for desensitizing a security tag of a product tag while the product tag is positioned within the bay of the housing, the desensitizer being activated upon receipt of the activation signal transmitted from the payment unit;

whereby product tags inserted into the bay of the housing are scannable for price and the desensitizer's desensitizing effect is limited to a corresponding security tag of the product tag scanned for price.

2. The system of claim 1, further comprising a sensor for ensuring retention of the product tag within the bay of the housing during a checkout transaction.

3. The system of claim 2, further comprising means for ensuring that the desensitizer is not activated if the sensor for ensuring retention of the product tag senses removal of the tag during the checkout transaction.

4. The system of claim 2, wherein the sensor is configured to prevent the desensitizer from being activated to desensitize a security tag of a product tag positioned within the bay of the housing if the sensor senses removal of the product tag after the price scanner has read price information from the product tag.

5. The system of claim 1, wherein the bay is dimensioned for receiving no more than one product tag.

6. The system of claim 5, wherein the slot opens to a plurality of bays, each for receiving no more than one product tag.

7. The system of claim 1, further comprising:

an anti-theft device; and a detector for detecting sensitized security tags present in a detection zone monitored by the detector, the detector being capable of activating the anti-theft device in the event that a sensitized security tag is detected in the detection zone.

8. The system of claim 1, wherein the price scanner comprises an optical scanner, the price information is encoded in bar code indicia, and the security tag is capable of being gaussed and degaussed.

9. The system of claim 1, further comprising a clamp for preventing removal of the product tag from the bay of the housing until the product tag has been scanned for price and the security tag has been desensitized.

10. A system for self-service checkout of merchandise by a customer at a retail store, the system comprising:

a payment card reader for reading account information stored on a payment card, the payment card reader being capable of transmitting the account information;

a housing substantially closed to the environment, the housing defining a slot opening to an internal bay dimensioned for receiving the product tag, the housing being configured for shielding a desensitizing effect from any security tags outside the housing;

a price scanner positioned within the housing for reading price information encoded on a product tag of an item while the product tag is positioned within the bay, the price scanner being capable of transmitting the price information;

a payment unit for receiving the price information from the price scanner, for communicating with an electronic payment network to seek approval of a charge to the payment card, and for transmitting an activation signal upon receipt of approval of the charge;

a selectively activatable desensitizer for desensitizing a security tag of a product tag while the product tag is positioned within the bay of the housing, the desensitizer being activated upon receipt of the activation signal transmitted from the payment unit;

a sensor for sensing removal of the product tag from the bay of the housing and preventing completion of a checkout transaction if the product tag is removed after being scanned for price by the price scanner and before desensitization by the desensitizer;

an anti-theft device; and a detector for detecting sensitized security tags present in a detection zone monitored by the detector, the detector being capable of activating the anti-theft device in the event that a sensitized security tag is detected in the detection zone; whereby product tags inserted into the bay of the housing are scannable for price and the desensitizer's desensitizing effect is limited to a corresponding security tag of the product tag scanned for price.

11. A method for performing a self service checkout transaction comprising the steps of:

receiving a product tag comprising a price tag and a security tag through a slot and into a bay of a housing substantially closed to the environment and capable of shielding a desensitizing effect from any security tags outside the housing;

reading account number data stored on a payment card;

reading price information stored on the price tag;

sensing whether the product tag has been removed from the bay after the price information was read; and activating a desensitizer to desensitize the security tag while positioned in the bay of the housing if it is sensed that the product tag has not been removed from the bay after being scanned for price.

12. The method of claim 11, further comprising the step of:

receiving approval of the charge;

wherein the desensitizer is activated to desensitize the security tag only if approval of the charge has been received.

13. The method of claim 12, further comprising the steps of:

clamping the product tag to retain the product tag within the bay of the housing after receiving the product tag; and releasing the product tag after the serial number data has been read.

14. The method of claim 11, further comprising the steps of:

clamping the product tag to retain the product tag within the bay of the housing after receiving the product tag; and releasing the product tag after activating the desensitizer.

15. The method of claim 11, further comprising the steps of:

monitoring a detection zone to detect sensitized security tags; and transmitting a signal to an anti-theft device if a sensitized security tag is detected within the detection zone.

16. The method of claim 11, further comprising the steps of:

reading serial number data stored on the product tag received in the bay of the housing;

seeking approval of a charge to the account number in the amount of a total;

storing the serial number data in a database if approval of the charge is granted;

detecting serial number data of a zone item present in a detection zone;

comparing the serial number data of the zone item to the serial number data stored in the database; and activating an anti-theft device if the serial number data of the zone item does not match any serial number data stored in the database.

17. The method of claim 16, wherein the serial number data is read only if the product tag has not been removed from the bay of the housing after the price data has been read.

* * * * *